United States Patent [19]

Imhoff

[11] E Re. 29,107

[45] Reissued Jan. 11, 1977

[54] DOOR COORDINATOR

[75] Inventor: William B. Imhoff, Springdale, Conn.

[73] Assignee: Leigh Products, Inc., Coopersville, Mich.

[22] Filed: Mar. 8, 1976

[21] Appl. No.: 664,882

Related U.S. Patent Documents

Reissue of:

[64] Patent No.: 3,894,356
Issued: July 15, 1975
Appl. No.: 455,609
Filed: Mar. 28, 1974

[52] U.S. Cl. ..... 49/366; 16/82; 292/262

[51] Int. Cl.[2] ..... E05C 7/05

[58] Field of Search ..... 49/366, 367, 368, 369, 49/68, 103; 16/82; 292/262

[56] References Cited

UNITED STATES PATENTS

| | | | |
|---|---|---|---|
| 2,015,996 | 10/1935 | Eichacker | 49/366 |

FOREIGN PATENTS OR APPLICATIONS

| | | | |
|---|---|---|---|
| 630,811 | 11/1961 | Canada | 49/367 |
| 507,185 | 8/1930 | Germany | 49/103 |
| 584,201 | 1/1947 | United Kingdom | 49/103 |

*Primary Examiner*—Philip C. Kannan
*Attorney, Agent, or Firm*—DeLio and Montgomery

[57] ABSTRACT

A door coordinator for pairs of swinging doors comprising a pair of arms on a common hub pivotally mounted in a bracket on the door frame, a longer arm adapted to move vertically into and out of the path of an active door and a shorter arm provided with a cam surface supplemented or constituted by a roller so located that the inactive door engages the cam surface and/or the roller for controlling the vertical movement of the shorter arm relative to the inactive door and the simultaneous vertical movement of the longer arm into and out of the path of the active door.

12 Claims, 11 Drawing Figures

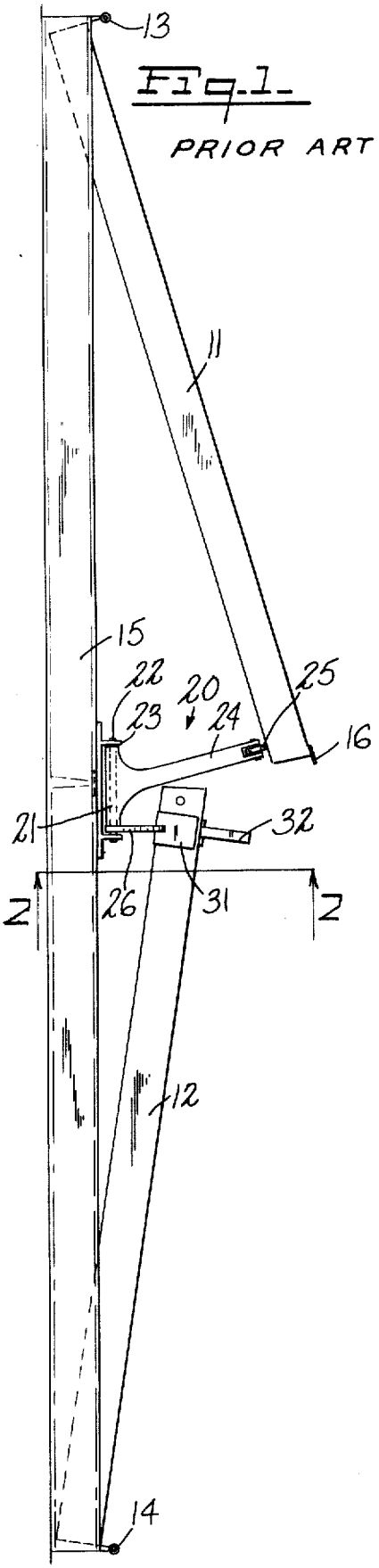
Fig. 1.
PRIOR ART
Fig. 2.
PRIOR ART
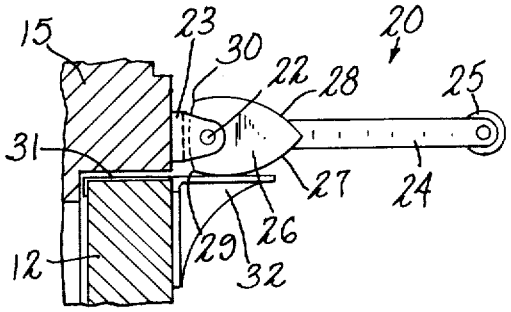
Fig. 3.
PRIOR ART
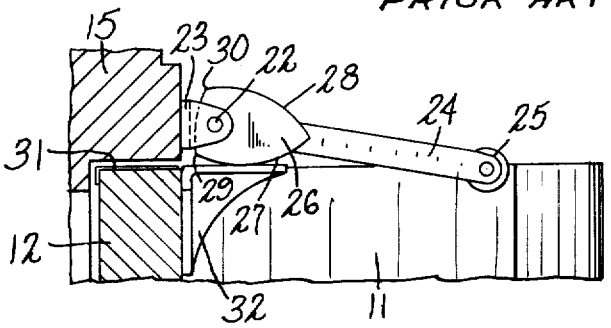
Fig. 4.
PRIOR ART
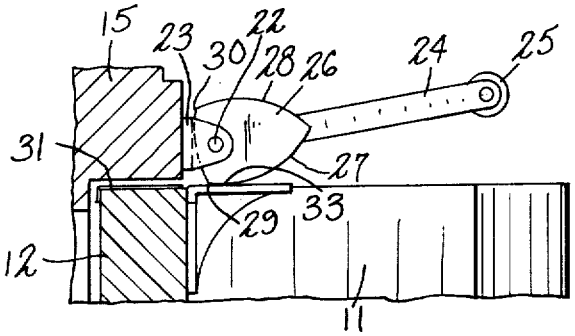

38
37
36
35
39
11
40
45
41
43
47
12
32
49
53
52
31
6
6

37
49
36
47
45
51
41
43
31
39
38
48
46
52
53
44
42
50
32
40
11
12

37
49
36
47
45
41
43
39
40
51
50
42
38
48
46
52
53
44
32
11
12

37
36
51
41
A
38
50
40
39
52
53
32
12

DOOR COORDINATOR

Matter enclosed in heavy brackets [ ] appears in the original patent but forms no part of this reissue specification; matter printed in italics indicates the additions made by reissue.

This invention relates to a door coordinator for properly controlling the sequential closing of a pair of swinging doors in which one is an active door and the other an inactive door.

In many installations, pairs of doors are utilized which are hinged to a door opening at the outside edges thereof.

The active door, in which the center latch is installed, is normally used to pass through the opening. The inactive door, which contains the strike for the center latch, is normally held closed by top and bottom bolts.

To insure proper clearance of an astragal, which may be mounted on either or both doors, or other hardware devices, a door closing coordinator is required. The coordinator holds the active door open until the inactive door reaches a closing position.

Such door coordinators generally comprise a hub member which is pivotally mounted about an axis above the top edges of the door. Such hub member has a first long arm which extends outwardly and downwardly to engage the active door and hold it until the inactive door reaches a closing position and releases the active door.

Defined on the hub member is a shorter arm which includes a camming surface adapted to be engaged by a strike plate mounted on the top edge of the inactive door to pivot the hub member and longer arm upwardly to insure that the active door is closed after the inactive door.

In a coordinator of the type just described, the distance traversed by the edge of the inactive door, from the point of first contact with the cam to the closed position, is quite short (e.g., about twice the door thickness) so that the cam profile heretofore used has presented a somewhat steeply angled surface to the contacting edge of the inactive door, in order to ensure adequate lifting of the longer member, and the cam surface has been convexly curved to maintain a comparably steep angle of contact as the inactive door approaches its closed position. It has been found that a cam of that shape must be located very precisely, in vertical relation to the top edge of the door. If too high, it will fail to lift the longer member clear of the active door. If too low, it may jam against the top of the inactive door and prevent or impair the latter from opening.

In view of the deficiencies of these present door coordinators the present invention provides a new and improved door coordinator in which criticality of placement of the coordinator is obviated, and the coordinator is more easily operated by the inactive door.

Briefly stated, the invention in one form thereof comprises a hub member as previously described with the stopping arm extending outwardly and downwardly therefrom when in an operative position and a linear camming surface which at all times insures a small contact angle with the active door. Preferably the camming means comprises a shorter arm providing a camming surface adapted to be engaged by the inactive door and a rolling member rotatably mounted behind the camming surface with its periphery extending beyond the camming member so as to be engaged by the strike plate mounted on the upper edge of the inactive door as the inactive door nears its closed position. The addition of the roller makes it possible to dispose the cam surface at a very advantageous angle, and insures proper functioning even when the coordinator is mounted at an incorrect height with reference to the top of the inactive door.

An object of this invention is to provide a new and improved coordinator for a pair of doors.

Another object of this invention is to provide a door coordinator having new and improved camming means adapted to be operated by the inactive door which camming means is relatively unaffected by misalignment of the coordinator mounting.

The features of the invention which are believed to be novel are particularly pointed out and distinctly claimed in the concluding portion of this specification. The invention, however, both as to its operation and organization together with further objects and advantages thereof may best be appreciated by reference to the following drawings wherein:

FIG. 1 is a top plan view of a pair of swinging doors provided with a coordinator according to the prior art where the doors are shown in an almost closed position where the coordinator starts to become operative;

FIG. 2 represents a vertical section seen in the plane of lines 2—2 of FIG. 1 with the doors closed and the coordinator in an inoperative position;

FIG. 3 is a view similar to FIG. 2 but with the coordinator mounted too high;

FIG. 4 is a view similar to FIG. 2 but with the coordinator mounted too low;

Figure 5:
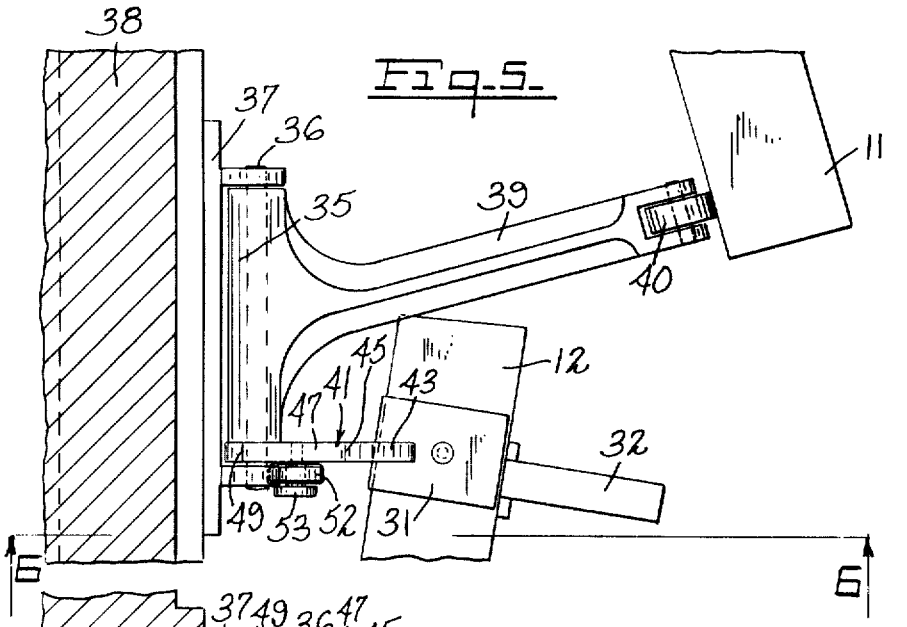
FIG. 5 represents a top plan view of the coordinator according to the invention associated with a door head frame and the course of a pair of swinging doors in a position corresponding to that of FIG. 1.

The disclosure of FIGS. 1 to 4 represents prior art.

As shown in FIG. 1, swinging doors 11, 12 are hinged at 13, 14 to close beneath a head frame 15. Each door is normally equipped with a door closer of any suitable type, not shown. The previously described active door 11, having an astragal 16, must be prevented from closing until the inactive door 12 has passed it and closely approached the closed position. It is the function of the coordinator 20 to effect this timing. The coordinator comprises a hub 21 pivotally supported by an axle or bearing member 22 in a bracket 23 mounted on the front of the head frame 15. Extending outwardly and downwardly from the hub is a long arm 24 angled so that its free end carrying a rotatable roller 25 can move into and out of the path of the active door 11. A shorter arm 26 in the form of a cam extends from hub 21 into the path of the inactive door. The arm 26 has curved lower and upper cam surfaces 27, 28 which are symmetrical with respect to a plane passing through the axis of the axle 22 and the center line of the longer arm 24. Such symmetry makes the coordinator reversible to cooperate with pairs of doors having either the right-hand door or the left-hand door the active one. The cam surfaces terminate rearwardly at corners 29, 30 adapted to abut the bracket 23 and to limit the downward rotation of the arms to a predetermined angle, normally approximately 15° from the horizontal.

When the bracket is installed in its proper relation to the top of the inactive door 12, the strike plate 31 on that door comes into contact with the cam surface 27, at an angle of about 22°, and further movement of the door 12 swings the coordinator upward so that the roller 25 on the arm 24 frees the door 11 from its stopped position and permits it to follow the inactive door to the fully closed position of FIG. 2, the cam surface 27 then resting on the door bracket 32 and the arms lying in a substantially horizontal position.

In practice, it has been found that vertical deviations in the height of the bracket 23, amounting to less than one-sixteenth inch either way from the proper position, can render the coordinator inoperative. When the bracket 23 is mounted on the head frame about one-sixteenth inch higher than it should be, the strike plate 31 hits the cam surface 27 closer to the axis of rotation of the cam and the continued closing of the door 12 does not lift the arm 24 high enough to release the active door (FIG. 3). When the bracket 23 is one-sixteenth inch too low (FIG. 4) the strike plate 31 hits the cam surface 27 close to the point of the cam, at an angle of about 26°. The continued closing of the inactive door swings the coordinator upward and brings the point of contact 33 between the cam surface 27 and the door bracket 32 to a position only 0.1 inch forward from the axis of the axle 22. The weight of the arms with this amount of leverage may cause the door to jam or bind in the vicinity of its closed position or greatly hinger its reopening. From the foregoing it will be recognized that the installation of such a coordinator, with tolerances which must be less than one-sixteenth inch, to cooperate with doors at least 30 inches in width, requires a degree of precision that is difficult to maintain in actual practice, particularly when the door hinges may have a vertical position tolerance.

Figure 6:
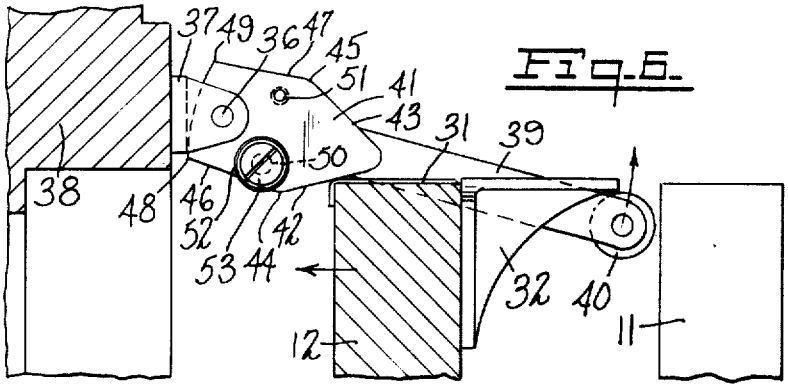
FIG. 6 represents a vertical section on the line 6—6 of FIG. 5.
Figure 7:
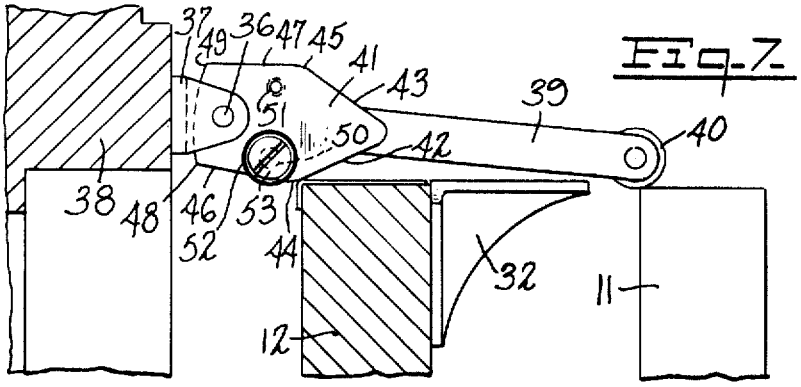
FIG. 7 represents a vertical section, corresponding to FIG. 6 with the inactive door nearly closed.
Figure 8:
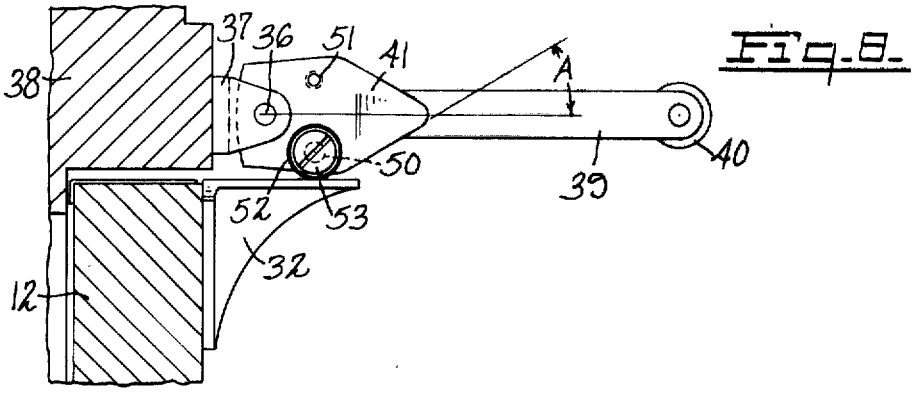
FIG. 8 represents a vertical section, corresponding to FIGS. 6 and 7 with both doors closed.

An improved coordinator in accordance with the invention which overcomes these problems is shown in FIGS. 5 to 8 and comprises a hub 35 pivotally supported by an axle 36 in a bracket 37 mounted on the front of a head frame 38. The hub has a longer arm 39 with a roller 40 on its free end, and a shorter arm 41 in the form of a cam. In its operative position, as shown in FIGS. 5 and 6, the arm 39 extends downwardly into the path of the door and outwardly to engage the door substantially perpendicularly as viewed in the plan. Arm 41 is positioned to be engaged by the inactive door. The arm 41 has lower and upper cam surfaces 42, 43, which are symmetrical with respect to a plane passing through the axis of the axle 36 and the center line of arm 39 as seen in FIG. 8. Each cam surface is substantially straight and lies at an angle A of about 30° from said plane. The cam surfaces terminate at points 44, 45, some distance forward from the axis of the hub, and the cams have straight lower and upper edges 46, 47, extending rearward from said points to the heel corners 48, 49, which correspond to the corners 29, 30 in FIG. 2, and also limit the downward rotation of the arms to approximately 15° below the horizontal. Rearwardly from the points 44, 45 the cam is provided with holes 50, 51 and the roller 52 rotates on a shoulder screw 53 which is fixed in the hole 50. The peripheral edge of the roller projects beyond the lower edge 46. In the coordinator shown, the hole 51 is non-functional. It is provided as an alternative to the hole 50 when reverse installation is required, the roller 52 and the screw 53 being then mounted in the hole 51 and the whole assembly being inverted. The roller 52 may suitably be of nylon or an equivalent durable plastic material.

In FIG. 6 the strike plate 31 of the inactive door 12 is just making contact with the cam surface 42 (at a favorable angle of about 15°) and the active door 11 has been stopped by the end of the longer arm 39. FIG. 7 shows the strike plate about to clear the point 44 as the roller 40 is about to clear the top of the door 11. As soon as the strike plate reaches the roller 52 the resistance to closing of the door 12 becomes minimal and it moves readily to its closed position (FIG. 8) with the roller idling out on the door bracket 32. The arm 39 is raised to a horizontal position, and the active door closes in its proper sequence.

Figure 9:
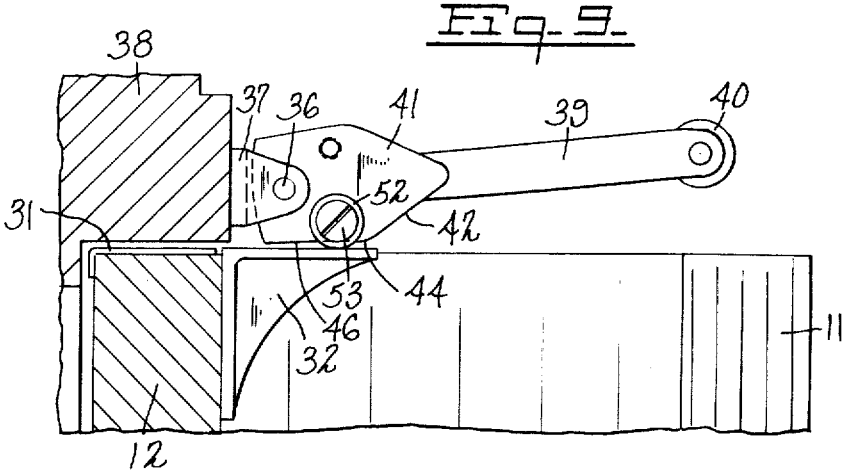
FIG. 9 is a view similar to FIG. 8 but with the coordinator mounted low.

The mechanism just described is not only very effective in its operation when properly installed, but also functions adequately even with faulty installation. FIG. 9 shows the position of the improved coordinator when mounted too low. The cam surface 42 would still be disposed at the predetermined favorable angle with respect to the horizontal. In this condition, as the inactive door 12 closes, the strike plate hits the linear surface 42 and pivots the cam and hub counterclockwise (as illustrated) and eventually reaches the roller 52. The operation is the same as exemplified in FIGS. 6, 7 and 8 except that the active door is released sooner and, upon closing, the plane passing through the center line of the arms may reside at a small angle upwardly from the horizontal. However, the roller 52 rests on the door bracket, and keeps the surfaces 46 and edge 44 above the bracket as shown in FIG. 9. As a result there will be no binding as between the coordinator cam and the inactive door.

Figure 10:
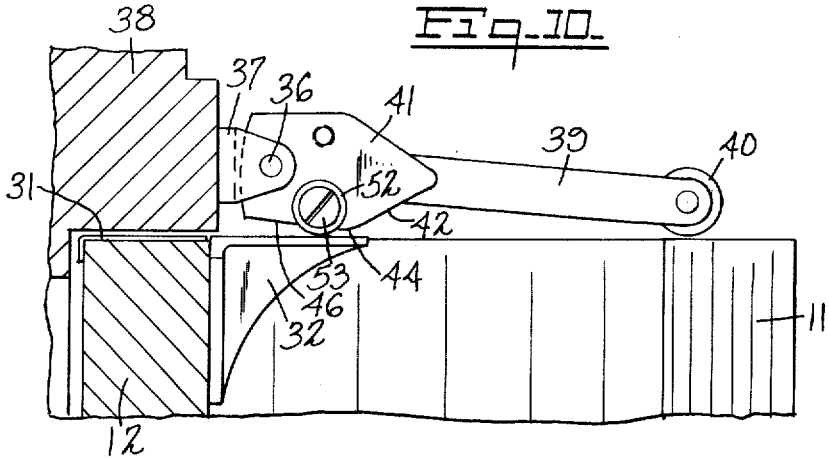
FIG. 10 is a view similar to FIG. 8 but with the coordinator mounted high.

If the coordinator is mounted too high, as shown in FIG. 10, the longer arm 39 will stop the active door as usual and the strike plate of the inactive door will make contact with cam 41 further back along the surface 42, nearer the point 44, but again at the same predetermined desired angle. Further closing of the inactive door produces contact of the door strike plate with roller 52 and further lifts the cam and coordinator. Finally, arm 39 will clear the active door and permit closing as shown in FIG. 10. The arm is slightly below the horizontal, but its end is high enough to clear the active door. In each of the closing positions immediately described above, FIGS. 9 and 10, the point of contact between the roller and the strike plate or door bracket is spaced a substantial distance away from the axis of axle 22, so that the leverage is favorable and there is no tendency to bind the inactive door, even if the roller should fail to roll easily.

Thus a coordinator embodying the invention may be installed within greater tolerances, and also to compensate for tolerances in the positioning of the hinges of the doors.

Figure 11:
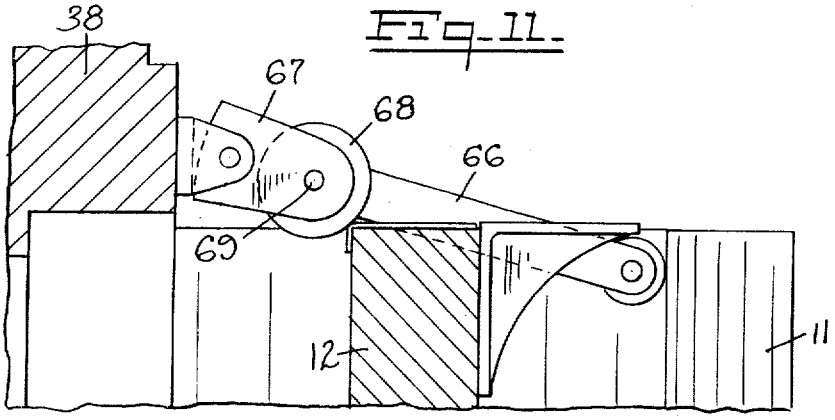
FIG. 11 is a view similar to FIG. 6 showing another embodiment of the invention.

While the combination of a roller with a straight cam surfaces gives particularly desirable results, it would be possible to obtain some advantages by the use of a single, relatively large, roller without a cam surface as shown in FIG. 11. In this modification the hub, the longer arm 66, and the hub mounting are substantially as described above, but the shorter arm 67 is bifurcated and the relatively large roller 68 rotates on a journal 69 between the bifurcations. The rim of the roller projects beyond the arm 67 above and below the plane of the arms, so that an arcuate surface is in a position to be contacted by the strike plate of the inactive door within a substantial vertical range of mounting and/or adjustment. The angle between the tangent to the roller and the horizontal at the point of contact with the strike plate varies from 45° to 60°, depending on the level of contact, and uniformity of operation is difficult to achieve. The roller 68 is of such dimensions that it may suitably be made of metal, rather than plastic, or of metal with a plastic rim.

Studies have shown that, compared to the prior art, the straight cam and roller coordinator according to the invention when used with typical 36 inch doors with conventional door closers and locks, requires 34% less force at the initial contact of the strike plate with the cam surface to raise the longer arm and allow the active door to close, and requires only 5% of the force formerly needed during the final 3 inches of closing of the inactive door. This latter decrease in required closing force is important because the momentum of the inactive door is almost used up in raising the arm to free the active door, so that the final 3 inches of closing has to be effected by means of the remaining force exerted by the door closer.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What I claim is:

1. A door coordinator adapted to control the closing of a pair of swinging doors constituted by an active door and an inactive door hung to swing into and out of closed position beneath a head frame, the coordinator comprising a hub, means mounting the hub on the head frame for rotation about a horizontal axis higher than the top edges of the doors, a pair of arms of unequal length fixed to and projecting from the hub and having their axes in a plane containing the axis of the hub, means limiting the downward swinging movement of said arms, the longer arm being angled with respect to the hub to cause its free end to lie, when below horizontal, in the swinging path of the active door, the shorter arm having a downwardly facing substantially straight elongated cam surface, the cam surface terminating at a bottom edge lying substantially parallel to said plane, and a roller mounted on said shorter arm with its periphery projecting beyond said bottom edge adjacent to the point of termination of the cam surface, said cam surface, in the lower position of the arms, lying in the swinging path of the upper edge of the inactive door.

2. A door coordinator according to claim 1 wherein the downward swinging movement of said arms is limited to an angle of approximately 15° below the horizontal.

3. A door coordinator according to claim 1 wherein said straight elongated cam surface is deposed at an angle of approximately 30° to said plane containing the axis of the hub.

4. A door coordinator according to claim 2 wherein said straight elongated cam surface is disposed at an angle of approximately 30° to said plane containing the axis of the hub.

5. A door coordinator according to claim 1 wherein the shorter arm has an upwardly facing substantially straight elongated cam surface and upper edge, symmetrical with the downwardly facing cam surface and bottom edge, above and below said plane containing the axis of the hub, and which includes means for mounting a roller on said shorter arm with its periphery projecting beyond said upper edge, whereby said coordinator is reversible.

*6. A door coordinator adapted to control the closing of a pair of swinging doors mounted to close a doorway constituted by an active door and an inactive door hung to swing into and out of closed position in said doorway, the coordinator comprising a hub portion extending between a long arm and a short arm fixed thereto, means for mounting the hub portion above the doorway for pivotal movement about a horizontal axis above the top edges of the doors between an upper inactive position and a lower operative position, the longer arm being positioned with respect to the hub to cause its free end when in an operative position to lie in the swinging path of the active door, the shorter arm positioned with respect to the hub to lie in the swinging path of the inactive door, the shorter arm having a lower camming edge which slants downwardly from an upper front portion thereof to a lower rearward portion thereof and adapted to be engaged by the inactive door upon closing to pivot said coordinator upwardly about the horizontal axis, and a roller mounted on said shorter arm with its periphery projecting below said shorter arm adjacent to said rearward portion of the camming edge, said shorter arm having a lower edge backward of said camming edge above the lower periphery of said roller extending to said hub, whereby as the inactive door closes it strikes said camming edge and pivots said arms upwardly and subsequently engages and moves under said roller and said longer arm moves to an upward position to enable closing of said active door.*

*7. The coordinator of claim 6 further including a plate-like member extending outwardly from the upper free edge of the inactive doors, said member holding said coordinator in a raised inactive position with said roller resting on said member when the inactive door is closed.*

*8. A door coordinator according to claim 6 wherein said arms having center lines residing in a plane with the axis of said hub, and said coordinator is limited to a downward pivotal position such that said plane is at an angle of approximately 15° below the horizontal when said coordinator is in an operative position.*

*9. The door coordinator of claim 6 wherein said camming surface is disposed at an angle of approximately 30° to said plane.*

*10. The door coordinator of claim 6 wherein said shorter arm has symmetrical upper and lower edges.*

*11. The door coordinator of claim 6 wherein said camming edge is substantially straight.*

*12. The door coordinator of claim 10 wherein said upper and lower edges are substantially straight.*

* * * * *

UNITED STATES PATENT AND TRADEMARK OFFICE

CERTIFICATE OF CORRECTION

PATENT NO. : Reissue 29107

DATED : January 11, 1977

INVENTOR(S) : William B. Imhoff

It is certified that error appears in the above–identified patent and that said Letters Patent are hereby corrected as shown below:

Column 2, line 37, "course" should read --corners--.

Column 6, line 3 of claim 7, "doors" should read --door--.

Column 6, line 2 of claim 8, "having" should read --have--.

Signed and Sealed this

Fifteenth Day of March 1977

[SEAL]

*Attest:*

RUTH C. MASON
*Attesting Officer*

C. MARSHALL DANN
*Commissioner of Patents and Trademarks*